United States Patent [19]
Eadara et al.

[11] Patent Number: 4,992,489
[45] Date of Patent: Feb. 12, 1991

[54] INDUCTION HEAT CURABLE EPOXY RESIN SYSTEMS

[75] Inventors: Rajan Eadara, East Lansing; Robert F. Armbruster, Okemos, both of Mich.

[73] Assignee: Ciba-Geigy Corporation, Ardsley, N.Y.

[21] Appl. No.: 488,485

[22] Filed: Mar. 1, 1990

Related U.S. Application Data

[63] Continuation of Ser. No. 244,196, Sep. 14, 1988, abandoned.

[51] Int. Cl.$^5$ .............................. C08K 3/22; C08K 3/10
[52] U.S. Cl. .................................... 523/458; 523/442; 427/45.1
[58] Field of Search .............. 523/442, 458; 427/45.1

[56] References Cited

U.S. PATENT DOCUMENTS

| | | | |
|---|---|---|---|
| 3,976,613 | 8/1976 | Schinabeck | 523/442 |
| 4,560,579 | 12/1985 | Siadat et al. | 427/45.1 |
| 4,762,864 | 8/1988 | Goel et al. | 523/458 |

*Primary Examiner*—Lewis T. Jacobs
*Attorney, Agent, or Firm*—Harry Falber

[57] ABSTRACT

Epoxy resin systems readily available for curing by the application of an induction heat energy source comprising a silica-filled, low viscosity epoxy resin in combination with an iron oxide or a steel powder.

17 Claims, No Drawings

INDUCTION HEAT CURABLE EPOXY RESIN SYSTEMS

This application is a continuation, of application Ser. No. 244,196, filed Sept. 14, 1988.

The diverse environments encountered with on-site repair of concrete surfaces and the like place stringent requirements on the repair mortar. Among the adverse environments encountered in repairing roads, runways, bridges, etc. are included the diversity of surface angles and positions such as vertical, horizontal and overhead surfaces, and adverse weather conditions including rain, snow, ice and temperature extremes. Accordingly, functional repair mortars should be readily applicable to all surface configurations under all weather conditions, should be capable of complete cure, should provide useful physical properties within reasonable periods of time and should maintain these properties under diverse environmental conditions.

Currently utilized repair mortars generally comprise two or three component epoxy resin systems. Thus, such two component systems include part A (a resin component with fillers) and part B (a hardener component) while three component systems include part A (a resin component), part B (a hardener) and part C (fillers), each of these necessarily being combined immediately before use under field conditions. These requirements are burdensome since two or three chemical systems must be carried to the repair site and since appropriate mixing apparatus must also be present at the site. However, the major disadvantage with the current systems is their slow curing characteristics and corresponding delayed attainment of useful physical properties only after periods of time as great as 24 hours. Adverse weather conditions at the time of application and curing also serve to delay the cure and/or undermine the integrity of the repair mortar.

Accordingly, it is the primary object of this invention to provide epoxy resin systems which can be readily utilized as repair mortars.

It is a further object to provide such systems which overcome the disadvantages of the prior art systems, particularly in terms of speed and flexibility of cure.

It is still another object to provide a method for curing such systems utilizing induction heat energy sources.

Further objects and advantages of the invention will become apparent from the following descriptions thereof.

It has now been surprisingly discovered that by incorporating iron oxide or steel powder into silica-filled, hardener-containing epoxy resin systems, enhanced performance characteristics are obtained. Thus, these improved systems can be rapidly cured utilizing induction heat energy sources. Such curing can be completed generally within a two hour period, providing useful physical properties for rapid reuse of the repaired structure. The systems are particularly useful under adverse and cold weather conditions, with both the speed of cure and the integrity of the cured system being maintained. The instant compositions can be advantageously formulated as single component systems eliminating field mixing prior to use or, if desired, can still be formulated as several distinct components taking advantage of the increased speed and degree of cure.

The epoxy resins used according to the invention may be any polyepoxide so far as it has on average, more than one epoxy group per molecule. It is preferably liquid at room temperature. It may be any of saturated and unsaturated, aliphatic, alicyclic, aromatic and heterocyclic epoxides. If desired, it may have a non-hindering substituent such as halogen atom, hydroxyl group, ether group, ester group and the like. Examples of said polyepoxides include epoxy novolac resins; polyglycidyl ethers of dihydric phenols such as 2,2-bis(4-hydroxyphenyl)propane, 1,1-bis(4-hydroxyphenyl)ethane, bis(4-hydroxyphenyl)methane, bis(4-hydroxyphenyl)sulfone, resorcinol and hydroquinone; polyglycidyl ethers of trihydric alcohols such as glycerin; polyglycidyl esters such as diglycidyl phthalate and diglycidyl isophthalate; cycloaliphatic epoxy resins; epoxidized esters of polyethylenically unsaturated fatty acids such as epoxidized linseed oil; epoxidized esters of unsaturated alcohols and unsaturated carboxylic acids such as 3,4-epoxycyclohexylmethyl 3,4-epoxycyclohexylcarboxylate; and epoxidized polyethylenically unsaturated hydrocarbons such as epoxidized 2,2-bis(2-cyclohexenyl)propane, epoxidized vinylcyclohexane, epoxidized cyclopentadiene dimer, and the like. Among these polyepoxides, polyglycidyl ethers of polyhydric phenols and especially diglycidyl ethers of dihydric phenols are preferred. Particularly preferred is the diglycidyl ether of 2,2-bis(4-hydroxyphenyl)propane. The epoxy resin component has preferably an epoxy equivalent weight in the range of 150–500 g/equivalent.

As noted, liquid resins are preferred. Applicable resins also include epoxy resins with lowered viscosities resulting from the presence of reactive diluents such as glycidyl ethers, glycol ethers, aromatic hydrocarbons, and the like.

Silica particles are known fillers for epoxy resin. It is preferred for purposes of this invention that the silica particles have a particle size distribution wherein substantially all (at least about 90%) of the particles fall within a −40 to +325 mesh size (U.S. Standard Sieve Series)-0.03–0.30 mm.

The components which respond to induction current include gamma iron oxide ($Fe_2O_3$), magnetic iron oxide ($Fe_3O_4$), steel powder and mixtures thereof. Steel powder is preferred, particularly when utilized in a particle size distribution equivalent to that of the silica particles.

Applicable curing agents for use with the filled epoxy resin systems are selected on the basis of whether the total formulated system will be utilized as a one-component or multi-component system. Thus, hardeners or catalytic hardeners exhibiting latent (i.e. delayed) curing characteristics are particularly applicable for the one component system, while conventional polyamines are applicable for use in the two- or three component systems. Latent hardeners include modified polyamides, e.g. diamine/bisphenol A/diglycidyl ether of bisphenol A reaction products; imidazoles such as 2-methylimidazole, 2-phenylimidazole, 1-benzyl-2-methylimidazole or 1-cyanoethyl2-methylimidazole; amidines such as dicyandiamide or 1-cyan-3-(lower alkyl)-guanidines (e.g. the 3-methyl-, 3,3-dimethyl- or 3,3-diethyl derivatives); boron trifluoride amine complexes; semicarbazide; polyhydrazides such as isophthalyl dihydrazide, sebacyl dihydrazide, and adipyl dihydrazide; and the like.

As suitable amines for use in the multi-component systems, there may be mentioned aliphatic or cycloaliphatic primary and secondary amines, including mixtures. Typical amines include ethylenediamine, hexamethylenediamine, trimethylhexamethylenediamine, methylpentamethylenediamine, diethylenetriamine, triethylenetetramine, tetraethylenepentamine, N,N-dimethylpropylenediamine-1,3, N,N-diethylpropylenediamine-1,3, bis(4-amino-3-methyl-cyclohexyl)methane, bis(p-aminocyclohexyl)methane, 2,2-bis-(4-aminocyclohexyl)propane, 3,5,5-trimethyl-s-(aminomethyl)-cyclohexylamine, 1,2-diaminocyclohexane, 1,4-diaminocyclohexane, 1,3-bis(aminomethyl)cyclohexane, 1,4-bis(aminomethyl)cyclohexane, N-aminoethylpiperazine and isophorone diamine, Preferred amines include 2,2,4-trimethylhexamethylenediamine, 2,4,4-trimethylhexamethylenediamine, 2-methylpentamethylenediamine, diethylenetriamine, triethylenetetramine, tetraethylenepentamine, 1,2-diaminocyclohexane, bis(p-aminocyclohexyl)methane, isophorone diamine, 1,4-bis(aminomethyl)cyclohexane, N-aminoethylpiperazine and 1,3-bis(aminomethyl)cyclohexane.

The various components are present in the following concentrations based on the total weight of the composition absent the hardener component: 4–50% of epoxy resin and preferably 5 to 20%; 40–80% of silica and preferably 50 to 70%; and 10–50% of the iron or steel component and preferably 25 to 45%. The curing agent is utilized in stoichiometric amounts ±50% relative to the unfilled epoxy resin with a 1:1 stoichiometry being preferred.

The respective materials are generally mixed at room temperature. The hardener component is immediately included for the one-component systems, or blended in at the site of repair for the multi-component systems. The blends generally exhibit cement-like consistency.

The resulting compositions are subjected to curing by the application of an induction heat energy source. For example, a high frequency generator can be utilized to provide induction current through a copper coil situated on the surface of the epoxy resin mortar composition. The time of induction heat application will generally range from 1 to 30 minutes at the determined power and frequency resulting in substantially complete curing in less than about three hours and generally in less than two hours. These curing rates are substantially faster than those for conventional epoxy repair mortars subjected to curing at ambient temperatures.

Upon curing, a network of high crosslink density occurs. Accordingly, the expression "cure" as used herein, denotes the conversion of the above epoxide material into insoluble and infusible crosslinked products.

The epoxy resins prepared according to the invention can furthermore be mixed, at any stage before cure, with usual modifiers such as extenders, other fillers and reinforcing agents, pigments, dyestuffs, organic solvents, plasticizers, tackifiers, rubbers, accelerators, diluents, and the like. As extenders, reinforcing agents, fillers and pigments which can be employed in the curible mixtures according to the invention there may be mentioned, for example: coal tar, bitumen, glass fibers, boron fibers, carbon fibers, cellulose, polyethylene powder, polypropylene powder, mica, asbestos, quartz powder, gypsum, antimony trioxide, bentones, lithopone, barite, titanium dioxide, carbon black or graphite. It is also possible to add other usual additives, for example, flameproofing agents, agents for conferring thixotropy, flow control agents such as silicones, cellulose acetate butyrate, polyvinyl butyrate, waxes, stearates and the like (which are in part also used as mold release agents) to the curable mixtures.

Although the curable epoxide resin mixtures are noted as being especially useful in the field of surface protection and repair, they are also applicable to the electrical industry, laminating processes and the building industry. They can be used in a formulation which is in each case suited to the particular end use such as compression molding compositions, casting resins, tooling resins, laminating resins, sealing and filling compositions and floor covering compositions.

The following examples will further illustrate the embodiments of the instant invention. In these examples, all parts are given by weight unless otherwise noted.

Example

The following formulations are prepared by thoroughly mixing the indicated components:

|  | parts | |
|---|---|---|
|  | 1 | 2 |
| Resin System | | |
| Modified diglycidyl ether of bisphenol A (eq. wt = 180–190)[1] | 8.62 | 8.62 |
| Silica sand (−40 +325 mesh) | 61.38 | 61.38 |
| Steel powder (−40 +80 mesh)[2] | 30.00 | — |
| Steel powder (−100 +250 mesh)[3] | — | 30.00 |
| Hardener | | |
| Modified aliphatic amine hardener[4] | 100.00 | 100.00 |

[1]ARALDITE GY 257 from Ciba-Geigy Corp.
[2]Ancor M from Hoeganaes Corp.
[3]Ancor Steel 1000 from Hoeganaes Corp.
[4]Modified trimethylhexamethylenediamine/bisphenol A/diglyclycidyl ether of bisphenol A reaction product The resin and hardener components are uniformly blended and then formed into a 2.54 cm × 2.54 cm × 5.08 cm mold. A copper coil is placed on the surface of the epoxy system and induction current as noted in the following table is applied through the coil for the indicated time period. Thereafter, observation is made as to the time necessary to complete cure as determined by the hardness of the system as it reaches a compression strength greater than 3000 psi.

| Epoxy System | Power (K-W) | Frequency (K-HZ) | Induction Time (min) | Depth of Cure (cm) | Time to Cure (hrs.) |
|---|---|---|---|---|---|
| 1 | 15 | 400 | 5 | 5.08 | 0.33 |
| 1 | 40 | 400 | 2 | 5.08 | 1.0 |
| 1 | 45 | 320 | 5 | 5.08 | 1.5 |
| 1 | 80 | 320 | 5 | 5.08 | 0.5 |
| 1 | 25 | 10 | 10 | 5.08 | >3.0 |
| 1 | 40 | 10 | 10 | 5.08 | 1.0 |
| 1 | 18 | 320 | 10 | 2.54* | 1.0 |
| 1 | 45 | 320 | 10 | 2.54* | 0.75 |
| 2 | 15 | 400 | 10 | 5.08 | 1.0 |
| 2 | 45 | 320 | 15 | 5.08 | 3.0 |
| 2 | 80 | 320 | 10 | 5.08 | 2.5 |

*modified mold depth

These data thus clearly indicate the acceleration of cure of the compositions of this invention.

It is also to be noted that comparable results can be anticipated in one component systems utilizing latent hardeners and/or by substituting the indicated iron oxides for the steel powder.

Summarizing, it is seen that this invention provides significantly improved induction heat curable epoxy resin compositions. Variations may be made in procedures, proportions and materials without departing from the scope of the invention as defined by the following claims.

What is claimed is:

1. A composition consisting of
   (a) 4–50%, by weight, of a liquid epoxy resin having on average more than one epoxy group per molecule;
   (b) 40–80%, by weight, of silica particles; and
   (c) 10–50%, by weight, of a component responding to induction current selected from the group consisting of iron oxides, steel powder and mixtures thereof.

2. The composition of claim 1, wherein said epoxy resin has an epoxy equivalent weight of 150–500 g/equivalent and is an epoxy novolac resin, a polyglycidyl ether of a dihydric phenol, a polyglycidyl ether of a trihydric alcohol, a cycloaliphatic epoxy resin, a polyglycidyl ester, an epoxidized ester of a polyethylenically unsaturated fatty acid, an epoxidized ester of an unsaturated alcohol and an unsaturated carboxylic acid or an epoxidized polyethylenically unsaturated hydrocarbon.

3. The composition of claim 1, wherein said liquid epoxy resin is a reactive diluent-modified epoxy resin.

4. The composition of claim 2, wherein said epoxy resin is a diglycidyl ether of a dihydric phenol.

5. The composition of claim 1, wherein the particle size of at least about 90% of all of said silica particles is within 0.03–0.30 mm.

6. The composition of claim 1, wherein component (c) is gamma $Fe_2O_3$, magnetic $Fe_3O_4$, steel powder or mixtures thereof.

7. The composition of claim 6, wherein component (c) is steel powder wherein the particle size of at least about 90% of all of the steel particles is within 0.03–0.30 mm.

8. A composition consisting of
   (a) 4–50%, by weight, of a liquid epoxy resin having on average more than one epoxy group per molecule;
   (b) 40–80%, by weight, of silica particles;
   (c) 10–50%, by weight, of a component responding to induction current selected from the group consisting of iron oxides, steel powder and mixtures thereof; and
   (d) a curing agent present in stoichiometric amounts ±50% relative to component (a).

9. The composition of claim 8 wherein said component (d) is a latent curing agent.

10. The product obtained by curing the composition of claim 8 by the application of an induction heat energy source thereto.

11. The product obtained by curing the composition of claim 9 by the application of an induction heat energy source thereto.

12. The composition of claim 8, wherein said epoxy resin has an epoxy equivalent weight of 150-500 g/equivalent and is an epoxy novolac resin, a polyglycidyl ether of a dihydric phenol, a polyglycidyl ether of a trihydric alcohol, a cycloaliphatic epoxy resin, a polyglycidyl ester, an epoxidized ester of a polyethylenically unsaturated fatty acid, an epoxidized ester of an unsaturated alcohol and an unsaturated carboxylic acid or an epoxidized polyethylenically unsaturated hydrocarbon.

13. The composition of claim 8, wherein component (a) is a reactive diluent-modified epoxy resin.

14. The composition of claim 12, wherein said epoxy resin is diglycidyl ether of a dihydric phenol.

15. The composition of claim 8, wherein the particle size of at least about 90% of all of said silica particles is within 0.03–0.30 mm.

16. The composition of claim 8, wherein component (c) is gamma $Fe_2O_3$, magnetic $Fe_3O_4$, steel powder or mixtures thereof.

17. The composition of claim 16, wherein component (c) is steel powder wherein the particle size of at least about 90% of all of the steel particles is within 0.03–0.30 mm.